(12) United States Patent
Hitching et al.

(10) Patent No.: US 11,729,478 B2
(45) Date of Patent: Aug. 15, 2023

(54) SYSTEM AND METHOD FOR ALGORITHMIC EDITING OF VIDEO CONTENT

(71) Applicant: Playable Pty Ltd, Drummoyne (AU)

(72) Inventors: Robert Andrew Hitching, Los Altos Hills, CA (US); Ashley John Wing, San Francisco, CA (US); Phillip John Wing, Drummoyne (AU)

(73) Assignee: Playable Pty Ltd, Drummoyne (AU)

( * ) Notice: Subject to any disclaimer, the term of this patent is extended or adjusted under 35 U.S.C. 154(b) by 0 days.

(21) Appl. No.: 16/218,351

(22) Filed: Dec. 12, 2018

(65) Prior Publication Data

US 2019/0182565 A1 Jun. 13, 2019

(30) Foreign Application Priority Data

Dec. 13, 2017 (AU) ................................ 2017905005

(51) Int. Cl.
*H04N 5/445* (2011.01)
*H04N 21/8549* (2011.01)
(Continued)

(52) U.S. Cl.
CPC ......... *H04N 21/8549* (2013.01); *G06F 16/71* (2019.01); *G06F 16/75* (2019.01);
(Continued)

(58) Field of Classification Search
CPC .............. H04N 21/812; H04N 21/814; H04N 21/8146; H04N 21/8549; H04N 21/47202;
(Continued)

(56) References Cited

U.S. PATENT DOCUMENTS 6,690,725 B1 2/2004 Abdeljaoud et al.
7,151,852 B2 12/2006 Gong et al.
(Continued)

FOREIGN PATENT DOCUMENTS

CN 106899809 6/2017
EP 2450898 A1 5/2012
(Continued)

OTHER PUBLICATIONS

Enns, Clint; Navigating algorithmic editing: Algorithmic editing as an alternative approach to database cinema, 2012 (Year: 2012).*

*Primary Examiner* — Annan Q Shang
(74) *Attorney, Agent, or Firm* — Jones Day

(57) ABSTRACT

A computer implemented method for algorithmically editing digital video content is disclosed. A video file containing source video is processed to extract metadata. Label taxonomies are applied to extracted metadata. The labelled metadata is processed to identify higher-level labels. Identified higher-level labels are stored as additional metadata associated with the video file. A clip generating algorithm applies the stored metadata for selectively editing the source video to generate a plurality of different candidate video clips. Responsive to determining a clip presentation trigger on a viewer device, a clip selection algorithm is implemented that applies engagement data and metadata for the candidate video clips to select one of the stored candidate video clips. The engagement data is representative of one or more engagement metrics recorded for at least one of the stored candidate video clips. The selected video clip is presented to one or more viewers via corresponding viewer devices.

14 Claims, 4 Drawing Sheets

(51) Int. Cl.
  *G06F 16/783* (2019.01)
  *H04N 21/442* (2011.01)
  *G06F 16/75* (2019.01)
  *G06F 16/71* (2019.01)
(52) U.S. Cl.
  CPC ........ *G06F 16/784* (2019.01); *G06F 16/7834* (2019.01); *H04N 21/44204* (2013.01)
(58) Field of Classification Search
  CPC ........ H04N 21/4532; H04N 21/44204; H04N 21/4331; H04N 21/435; H04N 21/235; H04N 21/21; H04N 21/2668; H04N 21/2343; H04N 21/23418; H04N 21/00; G06F 16/71; G06F 16/7834; G06F 16/75; G06F 16/784; G06F 16/783; G06K 9/00711; G06Q 30/0242; G06Q 30/0244; G06Q 30/0251; G06Q 30/0272; G06Q 50/01; G11B 27/031
  See application file for complete search history.

(56) References Cited

U.S. PATENT DOCUMENTS

| | | | |
|---|---|---|---|
| 7,203,620 B2 | 4/2007 | Li | |
| 7,212,666 B2 | 5/2007 | Zhang et al. | |
| 7,613,365 B2 | 11/2009 | Wang et al. | |
| 8,184,947 B2 | 5/2012 | Murabayashi et al. | |
| 8,195,038 B2 | 6/2012 | Liu et al. | |
| 8,634,638 B2* | 1/2014 | Han | G06K 9/00342 382/159 |
| 8,687,941 B2 | 4/2014 | Dirik et al. | |
| 8,849,648 B1* | 9/2014 | Bangalore | G06F 40/117 704/9 |
| 9,456,174 B2 | 9/2016 | Boyle et al. | |
| 9,569,787 B2 | 2/2017 | Karlsson et al. | |
| 9,659,219 B2 | 5/2017 | Lavi et al. | |
| 9,961,380 B1* | 5/2018 | Hwang | H04N 21/25891 |
| 10,129,573 B1* | 11/2018 | Sahasrabudhe | G06F 16/783 |
| 10,902,345 B2* | 1/2021 | Cavalin | H04L 67/535 |
| 2005/0217462 A1 | 10/2005 | Thomson et al. | |
| 2007/0046669 A1 | 3/2007 | Choi et al. | |
| 2007/0201558 A1 | 8/2007 | Xu et al. | |
| 2008/0019661 A1 | 1/2008 | Obrador et al. | |
| 2008/0187231 A1 | 8/2008 | Barbieri et al. | |
| 2008/0313031 A1* | 12/2008 | Li | G06Q 30/0277 705/14.73 |
| 2009/0313546 A1* | 12/2009 | Katpelly | H04N 21/23439 715/723 |
| 2010/0061695 A1 | 3/2010 | Furmanski et al. | |
| 2010/0274714 A1* | 10/2010 | Sims | G06Q 50/184 705/40 |
| 2012/0005224 A1* | 1/2012 | Ahrens | H04W 4/21 707/769 |
| 2012/0114310 A1 | 5/2012 | Hymel et al. | |
| 2012/0189284 A1* | 7/2012 | Morrison | G06F 16/583 386/282 |
| 2012/0321273 A1* | 12/2012 | Messmer | H04N 13/128 386/224 |
| 2013/0173819 A1* | 7/2013 | Lee | H04N 21/2662 709/231 |
| 2013/0282747 A1* | 10/2013 | Cheng | G06F 16/78 707/758 |
| 2013/0339180 A1* | 12/2013 | LaPierre | G06Q 30/0631 705/26.7 |
| 2014/0003716 A1* | 1/2014 | Fedorovskaya | G06K 9/00677 382/170 |
| 2014/0003737 A1* | 1/2014 | Fedorovskaya | G06Q 50/01 382/276 |
| 2014/0270482 A1* | 9/2014 | Chakraborty | G06K 9/00677 382/154 |
| 2014/0328570 A1* | 11/2014 | Cheng | H04N 21/44008 386/241 |
| 2015/0012946 A1* | 1/2015 | Woods | H04N 21/84 725/40 |
| 2015/0347578 A1 | 12/2015 | Tsai et al. | |
| 2016/0035392 A1* | 2/2016 | Taylor | G11B 27/329 386/241 |
| 2016/0037217 A1* | 2/2016 | Harmon | H04N 21/4756 725/9 |
| 2016/0071058 A1* | 3/2016 | Galuten | G06Q 50/01 705/7.36 |
| 2016/0071549 A1 | 3/2016 | Von Sneidern et al. | |
| 2016/0119390 A1 | 4/2016 | Moeinifar | |
| 2016/0353164 A1* | 12/2016 | Smolic | G11B 27/34 |
| 2016/0358628 A1 | 12/2016 | Liu et al. | |
| 2016/0365114 A1 | 12/2016 | Galant et al. | |
| 2016/0366330 A1* | 12/2016 | Boliek | G06F 3/0481 |
| 2017/0024614 A1 | 1/2017 | Sanil et al. | |
| 2017/0055014 A1 | 2/2017 | Bou Balust et al. | |
| 2017/0075977 A1 | 3/2017 | Yadav et al. | |
| 2017/0109763 A1 | 4/2017 | Tsai et al. | |
| 2017/0134810 A1* | 5/2017 | Kashyap | H04N 21/4788 |
| 2017/0195576 A1 | 7/2017 | Desai et al. | |
| 2017/0330529 A1* | 11/2017 | Van Mourik | G09G 5/02 |
| 2018/0144256 A1* | 5/2018 | Saxena | G06N 20/00 |
| 2018/0197575 A1* | 7/2018 | Doherty | G06Q 30/0276 |
| 2018/0227615 A1* | 8/2018 | Lopatecki | H04N 21/6582 |
| 2019/0311694 A1* | 10/2019 | Van Mourik | H04N 21/4358 |

FOREIGN PATENT DOCUMENTS

| | | |
|---|---|---|
| KR | 2020000029755 | 3/2001 |
| WO | WO 2016/200692 A1 | 12/2016 |

* cited by examiner

SYSTEM AND METHOD FOR ALGORITHMIC EDITING OF VIDEO CONTENT

BACKGROUND OF THE INVENTION

1. Field of the Invention

The present invention relates to systems and methods for analysis and algorithmic editing of video content. More generally, the invention relates to digital marketing, publishing and advertising techniques, utilising algorithmically edited video.

2. Description of the Related Art

The ubiquity of high-speed networks has, in recent years, resulted in a dramatic increase in the amount of digital video content being generated and consumed.

The thirst for video content, particularly over mobile devices (e.g. tablets, phones and the like) has resulted in new and efficient techniques for delivering high quality digital video content to viewers, including via social media platforms (e.g. Facebook, Instagram, etc.), publisher websites and email.

One such technique is to generate a short clip of the source video (i.e. an edit containing selected time sequences from the source video) that is delivered to a viewer over one of the afore-mentioned digital mediums. If the user is interested in what they see, they can click on the video clip for finding out further information about the content.

It will be appreciated that different edits of the source video may be more appealing to some viewers than others. For example, where the source video is an action comedy movie, one viewer may be more likely to engage with the video clip if it contains primarily action sequences, while another may be more likely to engage with a clip that contains more comedy sequences.

It would be advantageous if there was provided a system and method that could selectively edit video content for generating video clips that are optimised for a target audience, audience segment or individual viewer.

BRIEF SUMMARY OF THE INVENTION

In accordance with a first aspect of the present invention there is provided a computer implemented method for algorithmically editing digital video content, the method comprising the steps of: processing a video file containing source video to extract metadata representative of at least one of: video content within the source video; and audio content within the source video applying labels to the extracted metadata and storing the labelled metadata in a metadata store in association with the video file; processing the labelled metadata to identify higher-level labels for the labelled metadata; storing any identified higher-level labels in the metadata store as additional metadata associated with the video file; implementing a clip generating algorithm that applies the stored metadata for selectively editing the source video to thereby generate a plurality of different candidate video clips therefrom; storing the plurality of candidate video clips in a video clip data store; storing metadata for the plurality of candidate video clips in the metadata store; responsive to determining a clip presentation trigger, implementing a clip selection algorithm that applies engagement data and metadata for the candidate video clips to select one of the stored candidate video clips, the engagement data being representative of one or more engagement metrics recorded for at least one of the stored candidate video clips; and presenting the selected video clip to one or more viewers via corresponding viewer devices.

In an embodiment the method further comprises processing the labelled metadata to infer applicable video genres and subgenres that are associated with individual labels or groupings of labels in the labelled metadata and wherein the inferred video genres are stored as additional metadata.

In an embodiment the method further comprises determining a digital medium by which the selected video clip is to be presented and wherein the digital medium is additionally applied by the clip generating algorithm for determining how to edit the source video for generating the plurality of candidate video clips.

In an embodiment the method further comprises determining individual viewer profile data for the viewer(s) and wherein the individual viewer profile data is additionally applied by the clip selection algorithm for selecting the candidate video clip to present to the one or more viewers.

In an embodiment the one or more engagement metrics are selected from the following: a dwell time recorded for viewers that have previously been presented the corresponding candidate video clip; and a number of times a predefined event has been executed during or following a prior presentation of the corresponding candidate video clip.

In an embodiment the metrics are recorded in association with a context for the prior presentation and wherein the method further comprises determining a current context for the presentation such that clip selection algorithm applies more weight to metrics associated with the current context than metrics that are not associated with the current context.

In an embodiment the method further comprises determining audience profile data for a collective group of viewers that are to be presented the selected video clip and wherein the audience profile data is applied by at least one of the clip generating and clip selection algorithms.

In an embodiment the method further comprises processing the labelled metadata to identify labels that occur within a statistically determined proximity of another associated label and storing the result in the metadata store as additional metadata associated with the video file.

In an embodiment the step of processing the video file to determine metadata representative of video content comprises analysing pixels within each frame of the video to measure brightness levels, detect edges, quantify movement from the previous frame, and identify objects, faces, facial expressions, scene changes, text overlays, and/or events.

In an embodiment the step of processing the video file to determine metadata representative of audio content comprises analysing audio within the video file to determine predefined audio characteristics.

In an embodiment the step of processing the video file to determine metadata representative of audio content comprises performing a speech recognition process to determine speech units within the source video.

In an embodiment the method further comprises extracting metadata embedded in the video file and storing the embedded metadata in the data store in association with the video file.

In an embodiment the metrics are recorded and applied in real, or near real time, by the clip selection algorithm.

In accordance with a second aspect of the present invention there is provided a computer system for algorithmically editing digital video content, the system comprising: a server system implementing a: video analysis module configured to: process a video file containing source video to extract metadata representative of at least one of: video content within the source video; and audio content within the source video apply label taxonomies to the extracted metadata and storing the labelled metadata in a metadata store in association with the video file; process the labelled metadata to: identify higher-level labels for the labelled metadata; and infer video genres that are associated with individual labels or groupings of labels in the labelled metadata; store any identified higher-level labels and video genres in the metadata store as additional metadata associated with the video file; and clip selection module configured to: implement a clip generating algorithm that applies the stored metadata for selectively editing the source video to thereby generate a plurality of different candidate video clips therefrom; store the plurality of candidate video clips in a video clip data store; store metadata for the plurality of candidate video clips in the metadata store; responsive to determining a clip presentation trigger on a viewer device, implement a clip selection algorithm that applies engagement data and metadata for the candidate video clips to select one of the stored candidate video clips, the engagement data being representative of one or more engagement metrics recorded for at least one of the stored candidate video clips; and present the selected video clip to one or more viewers via corresponding viewer devices.

In accordance with a third aspect there is provided a computer system for algorithmically editing digital video content, the system comprising: a server system implementing a: video analysis module configured to: process a video file containing source video to extract metadata representative of at least one of: video content within the source video; and audio content within the source video apply labels to the extracted metadata and storing the labelled metadata in a metadata store in association with the video file; process the labelled metadata to identify higher-level labels for the labelled metadata; store any identified higher-level labels in the metadata store as additional metadata associated with the video file; and clip selection module configured to: implement a clip generating algorithm that applies the stored metadata for selectively editing the source video to thereby generate a plurality of different candidate video clips therefrom; store the plurality of candidate video clips in a video clip data store; store metadata for the plurality of candidate video clips in the metadata store; responsive to determining a clip presentation trigger, implement a clip selection algorithm that applies engagement data and metadata for the candidate video clips to select one of the stored candidate video clips, the engagement data being representative of one or more engagement metrics recorded for at least one of the stored candidate video clips; and present the selected video clip to one or more viewers via corresponding viewer devices.

In accordance with a fourth aspect there is provided a computer implemented method for algorithmically editing digital video content, the method comprising the steps of: processing a video file containing source video to extract metadata representative of at least one of: video content within the source video; and audio content within the source video applying labels to the extracted metadata and storing the labelled metadata in a metadata store in association with the video file; implementing a clip generating algorithm that selectively edits the source video utilising the extracted metadata to thereby generate a plurality of different candidate video clips therefrom; storing the plurality of candidate video clips in a video clip data store; responsive to determining a clip presentation trigger, implementing a clip selection algorithm that selects one of the candidate video clips to one or more viewers via corresponding viewer devices, the selection being based, at least in part, on an evaluation of metadata for the stored candidate video clips.

In accordance with a fifth aspect there is provided a non-transitory computer readable medium storing at least one instruction, which when executed by a computing system, is operable to carry out the method as described in accordance with the first aspect.

BRIEF DESCRIPTION OF THE DRAWINGS

Features and advantages of the present invention will become apparent from the following description of embodiments thereof, by way of example only, with reference to the accompanying drawings, in which.

DESCRIPTION OF THE PREFERRED EMBODIMENTS

Embodiments of the invention described herein relate to systems and methods for algorithmic editing of digital video for optimising audience engagement therewith.

General System Architecture

Figure 1:
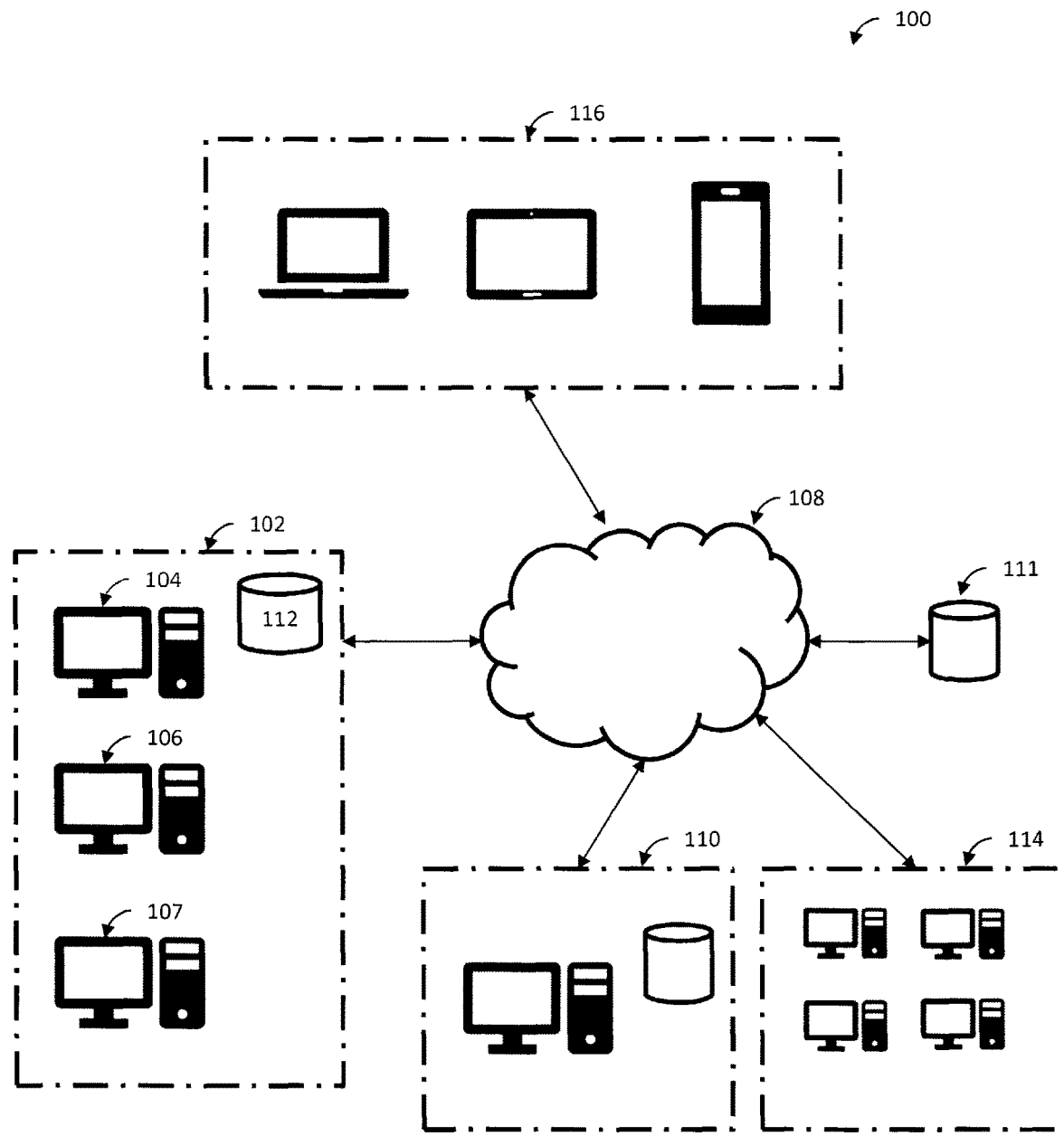
FIG. 1 is a schematic representation of a computer system for implementing one or more embodiments of the present invention.

With reference to FIG. 1, there is shown a schematic representation of a computer system 100 in accordance with an embodiment of the present invention.

The computer system 100 comprises a video clip engagement system 102 that in turn comprises a video analysis server 104 and an algorithmic editing server 106. The video analysis server 104 is communicable over a communications network (in this instance taking the form of the Internet 108) with a source video server 110 for receiving source video files stored thereby. The source videos are stored by the video server 110 in any suitable file format, including, but not limited to, MOV and MP4 file format.

As will be described in more detail in subsequent paragraphs, the video analysis server 104 is configured to analyse video files received from the video server 110 for extracting various forms of metadata. The extracted metadata is subsequently stored in aggregated form in a video metadata data store 112 (i.e. with a reference to the corresponding video file). The data store 112 may be implemented using any suitable data stored, for example, a relational or non-relational database application program, such as, e.g., Oracle, Sybase and the like. According to the embodiment described herein, the data store 112 takes the form of a SQL database.

The algorithmic editing server 106 implements one or more video clip generating algorithms for generating a selection of candidate video clips for each source video (i.e. based on input metadata stored in the data store 112). The candidate video clips are subsequently communicated to a video clip distribution network 114 that stores and delivers the video clips when requested by viewer devices. The video clip distribution network may take on any suitable physical form, for example including one or more streaming servers that are configured to stream video clips to viewer devices using techniques well understood in the art. In addition, the algorithmic editing server 106 is configured to store the relevant aggregated metadata for each candidate video clip, which is a subset of the metadata for the source video, in the data store 112 with reference to the corresponding stored video clip.

When a viewer device 116 requests a video, the algorithmic editing server 106 implements a video clip selection algorithm that applies the aggregated metadata for the stored video clips for selecting a candidate video clip to deliver to the viewer device.

As will become evident from subsequent paragraphs, the clip selection algorithm is configured to select the candidate video clip that is most likely to result in the highest viewer engagement (and in turn increase the likelihood of the viewer accessing the complete source video, and/or take some subsequent action desired by the system 102, as a result of having viewed the video clip). The selected candidate video clip is subsequently delivered to the viewer device 116 by the video clip distribution network 114. It will be understood that the selected video clip may be streamed, sent as a complete file, or otherwise electronically delivered to the viewer device, depending on the digital medium.

The viewer devices 116 may take on various forms, including but not limited to, a general-purpose computer, laptop, smartphone, tablet, smart TV, or any suitable network-enabled computing device that implements a display screen and the appropriate software for playing a video clip delivered by the video clip distribution network 114.

Further, the mode of digital delivery of the video clip (i.e. digital medium) may vary, depending on the desired implementation. For example, one mode of delivery may be via e-mail. In this example configuration, the video clip engagement system 102 may include an image or video with a source URL referencing the engagement system 102 in the HTML content of an email sent to a viewer or group of viewers. Opening the email using an email application resident on the viewer device 116 causes the email application to parse the HTML content and send a content request to the URL maintained by the engagement system 102 to retrieve the image or video, which triggers the algorithmic editing server 106 to dynamically select an appropriate video clip and in turn respond with an HTTP re-direct instruction causing the email application to retrieve the corresponding video clip from the content distribution network 114.

Another mode of delivery may be via a mobile application retrieving video content using a streaming protocol. In this example, a streaming manifest that specifies the video files to be delivered to a viewer device is provided by the engagement system 102 and is dynamically adjusted to specify the location of the chosen video clip on the content distribution network 114. Another mode of delivery may be via a number of Facebook video advertisements targeted at audience segments. In this example, a number of video clips are uploaded to Facebook along with targeting criteria for each (e.g. located in a particular country, aged between a predefined range, or any other ascertainable profile data), and Facebook systems show the relevant candidate video clip to each viewer that matches the specified targeting criteria.

Finally, the engagement system 102 can be communicable with a customer relationship management database 111 for receiving data relating to the intended audience (e.g. the comedy version of a video clip is to be delivered to one or more viewers that are known to have a preference for comedy movies).

Process Flow for Video Analysis

Figure 2:
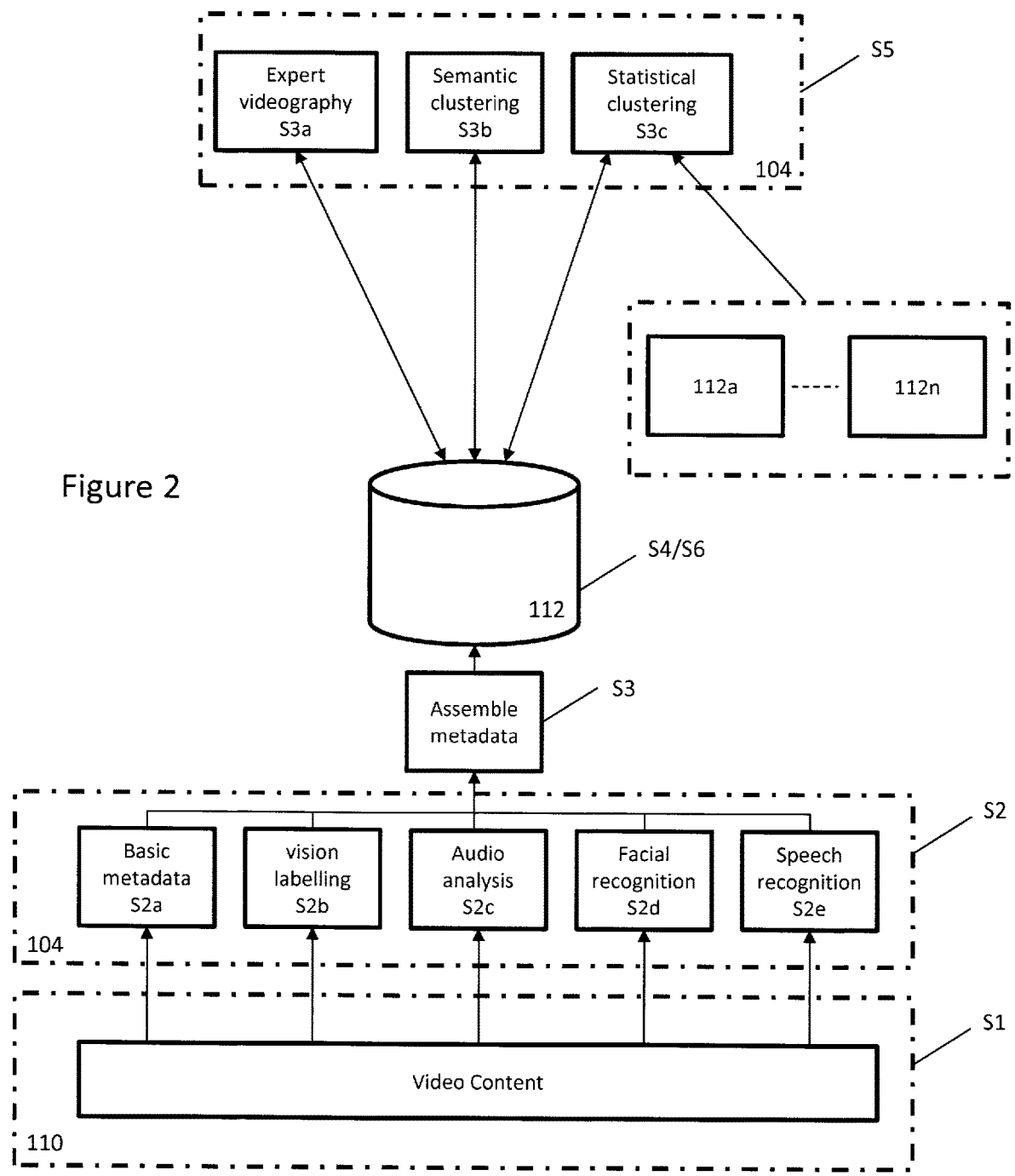
FIG. 2 is a schematic representation of a process flow for analysing a source video for metadata extraction, according to an embodiment of the invention.

FIG. 2 shows a schematic representation of a process flow for analysing a source video for metadata extraction, according to an embodiment of the invention.

In step S1, the video analysis server 104 communicates with the source video server 110 for receiving a source video. Alternatively, the source video may be retrieved from local file storage, uploaded from a portable storage drive, or received via any other suitable wired or wireless digital communication means.

At step S2, the video analysis server 104 implements a program configured to process the source video to extract various forms of metadata (steps S2a to 2e).

More particularly, at step S2a, any basic metadata embedded within the source video is extracted by the program. By way of example, the embedded metadata may comprise: title; description; tags; source; resolution; duration and the like. The basic metadata may also be obtained from the source video server 110, where available. Also, at step S2a, a video processing engine implemented by the video analysis server 104 is operable to analyse each frame of the video to measure brightness levels and variance from the previous frame. Recorded brightness and variance metrics are timestamped and labelled. As an example, brightness levels may be used to exclude clips with fade-in or fade-out durations that exceed a predefined optimal duration for the target media.

At step S2b, computer vision labelling is employed by the video analysis server 104 to identify objects, text overlays, events and/or scene changes within the source video. The identified objects, text overlays, events and scene changes are timestamped and labelled (based on label taxonomy data stored by the analysis server 104). In a particular embodiment, the video analysis server 104 implements the Google VideoIntel service (see http://https://cloud.google.com/video-intelligence/) which evaluates pixels within each frame of the source video using deep-learning models for object, event and scene change labelling. Another suitable form of evaluation and identification software application is the Amazon Rekognition Service (see https://aws.amazon.com/rekognition).

At step S2c, an audio analysis is carried out by the video analysis server 104 for detecting predefined audio characteristics within the source video, such as a quiet scene, noisy scene, explosion, indoor scene, outdoor scene, speech, laughter, ambient noise or any other desired predefined audio characteristic. Again, the detected characteristics are timestamped and labelled. In a particular embodiment, the server 104 implements the SensAI service (see http://audeering.com/technology/sensai/) for identifying the audio characteristics.

At step S2d, a facial detection, recognition and interpretation procedure is carried out by the video analysis server 104 for detecting and recognising faces that appear in different frames and scenes, and interpreting the emotional expressions (for example, surprise, excitement, anger) on each face in each frame. Any identified faces and expressions are timestamped and labelled. Again, in a particular embodiment, the server 104 implements the Google VideoIntel service which evaluates pixels within each frame for facial detection and recognition. As an example, facial recognition metadata may be used to generate candidate video clips focused on the parts of a source video including a particular face or which include a particular facial expression.

At step S2e, a speech recognition module employing one or more speech recognition engines is implemented by the video analysis server 104 for identifying speech within the source video, using techniques well understood in the art. In a particular embodiment, the speech recognition module is configured to identify selected predefined words or utterances within the source video. Any identified words/utterances are timestamped and labelled.

At step S3, the metadata extracted/determined in step S2 is normalized into a consistent data structure independent of the source of the metadata, and stored, in aggregated form in the data store 112 in association with the source video (step S4).

At step S5 the metadata is processed to identify higher-level labels for the labelled metadata (step S5a); infer video genres/sub-genres that are associated with individual labels or groupings of labels in the labelled metadata (step S5b); and for statistical clustering (step S5c). The results of any additionally derived metadata resulting from step S5 is stored in the data store 112.

In more detail, step S5a comprises applying codified videography knowledge to determine, for example, applicable genres/subgenres based on individual labels or label groupings that occur in a particular sequence.

For example, the labels "bonfire", "combat" and "dance" may have been identified and associated with a particular source video in step S2 (e.g. embedded within the source video file, identified as a result of the speech recognition, or object detection processes S2d/S2e). As shown in Table 1 below, the codified videography knowledge is applied to recognise the label "bonfire" as implying a historical drama with a weighting of 0.7, or a romantic comedy with a weighting of 0.5, or a historical fantasy genre with a weighting of 0.7. The label "combat" is recognised as implying a historical drama with a weighting of 0.5, a historical fantasy with a weighting of 0.8, or a superhero action film with a weighting of 0.6. Finally, the label "dance" is recognised as implying a romantic comedy with a weighting of 0.7.

TABLE 1

| Label | Inferred Genre/Subgenre | Weighting |
| --- | --- | --- |
| Bonfire | Drama/Historical Drama | 0.7 |
| Bonfire | Comedy/Romantic Comedy | 0.4 |
| Bonfire | Fantasy/Historical Fantasy | 0.7 |
| Combat | Drama/Historical Drama | 0.5 |
| Combat | Fantasy/Historical Fantasy | 0.8 |
| Combat | Action/Superhero | 0.6 |
| Dance | Comedy/Romantic Comedy | 0.7 |

The software algorithm evaluates the combined weightings and records the genre/subgenre that has the highest cumulative weighting. In an embodiment, the codified videography knowledge is embodied by software which is programmed to automatically input any labels identified in step S4, run an algorithm that sums the associated weightings (which may be stored in table format) and output the most likely genre and/or subgenre. In an alternative embodiment, each label is additionally weighted by the duration of its detected presence in the source video, and/or a confidence metric representing how certain the label appears.

Step S5b comprises determining higher-level labels for the labelled metadata identified in steps S2 and S3 using one or more semantic clustering algorithms. By way of example, metadata associated with the label "cat" may also be associated with the label "animal". This semantic clustering is achieved using a semantic knowledge graph such as that provided by Google Knowledge Graph (see URL: https://developers.google.com/knowledge-graph/).

Step S5c comprises clustering labels that are in close proximity to other labels, either within a single source video, or across a sample of many videos. In this regard, the video analysis server 104 is configurable to extract and process metadata for other video sources (112a to 112n) for determining label clusters.

In a particular embodiment, clusters are determined using a k-medoids unsupervised learning algorithm, as will be understood by persons skilled in the art (although it will be understood that any suitable clustering algorithm could be utilised, depending on the desired implementation). Further, according to embodiments described herein, the "proximity" between two labels is implemented by a statistical proximity software algorithm implemented by the video analysis server 104. The statistical proximity algorithm is programmed to statistically calculate proximity between labels based on the frequency and proportion of time that two or more labels are detected alone and simultaneously in the source video (and optionally other videos). Further, the selection of the optimal number of clusters to be formed may be implemented by calculating the optimal Calinski-Harabasz Index for a range of possible values of k.

By way of example, the statistical proximity algorithm may determine the number of times and the corresponding time periods (i.e. determined from the timestamps recorded at step S2) that the label "bonfire" was detected in the source video. Similarly, the algorithm may determine the number of times and corresponding time periods that a particular actor was detected in the source video. If multiple instances of both the bonfire and actor were detected, but neither occurred at the same time as the other (i.e. there was no overlap in their corresponding time stamps), then the proximity algorithm may determine that the labels are not statistically close (i.e. are "independent"). On the other hand, if each instance of bonfire occurred at the same time each instance of the actor was determined, then the algorithm may determine that the two labels are very close in distance. It will be understood that the distance may be represented in any suitable form, such as percentage (e.g. 0% reflects no proximity, whereas 100% represents the closest relationship achievable), an absolute score or rating (e.g. 0 to 10), etc.

Process Flow for Video Editing and Clip Selection

Figure 3:
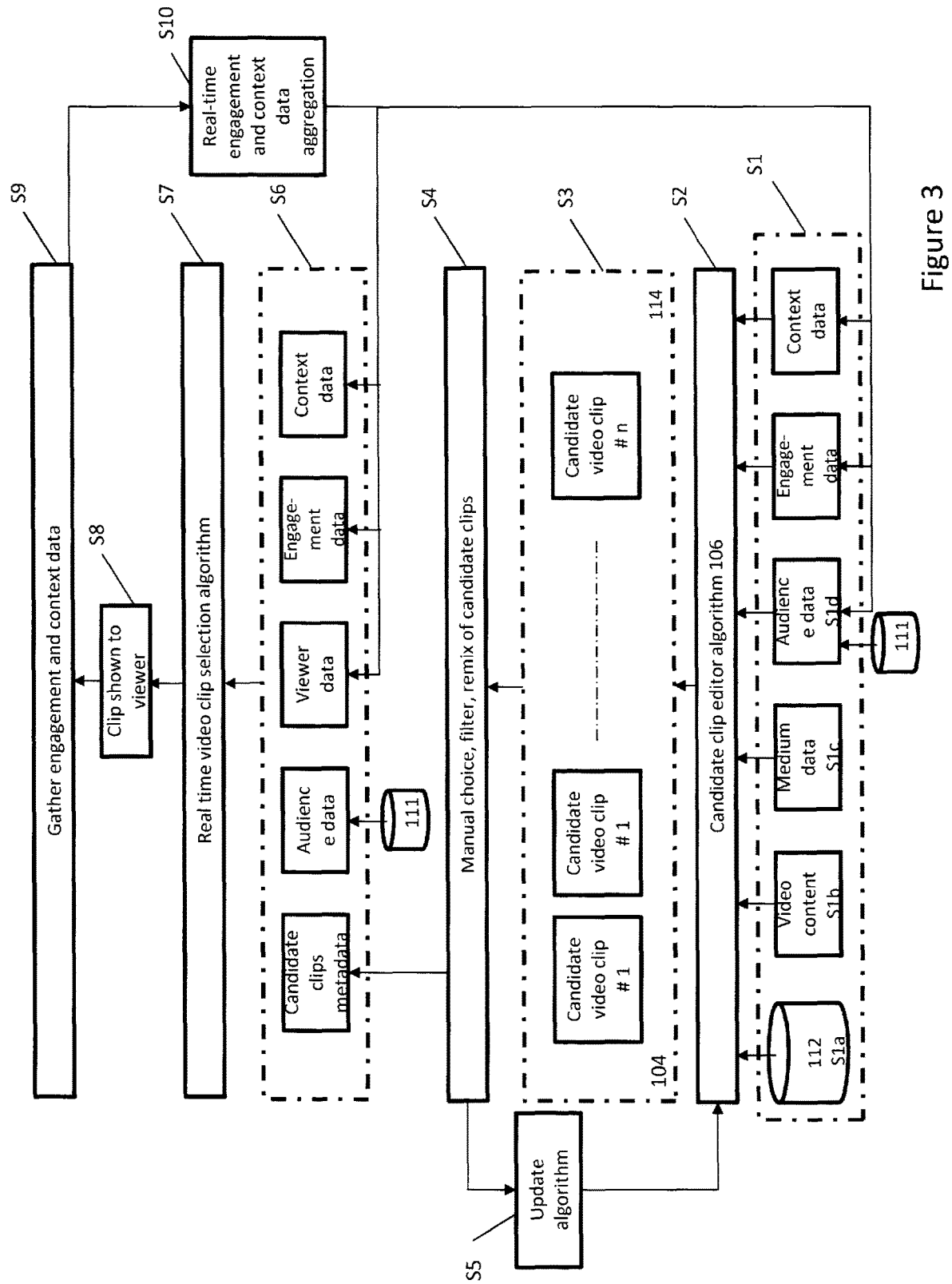
FIG. 3 is a schematic representation of a process flow for generating candidate video clips and presenting a selected candidate clip to a viewer device.

FIG. 3 shows a schematic representation of a process flow for editing a source video for generating multiple clips that are dynamically selectable for delivery to viewers.

At steps S1a and S1b of FIG. 3, a source video and the corresponding metadata is retrieved and temporarily stored by the algorithmic editing server 106. At step S1c, medium data for the video clip presentation is determined. By way of example, if the digital medium is Instagram, the data may indicate that the video clip will be initially muted, played as an infinite loop, have a square aspect ratio, and support subtitles. For e-mail presentation, the medium data may indicate that the video clip will be muted, have a single loop, have a landscape aspect ratio and be of 10 second duration.

If there is any audience data available it is retrieved from the CRM store 111 (step S1d). By way of example, audience data may indicate that the target viewers have a preference for movies that are in the "horror" genre.

Step S1e involves retrieving any engagement data associated with the source video or related source videos. Engagement data is representative of one or more engagement metrics that are recorded from previous aggregate audience interactions with video clips edited from the source video, or from other source videos.

As will be discussed in more detail below, engagement data is collected by various methods specific to each medium, and normalized to be independent of the medium, such that all engagement data can be aggregated. For example, engagement data resulting from video clips presented via email includes click-to-open-rate, which is collected by diverting clicks on the video clip and other content within the email via the algorithmic editing server 106. An example of aggregate engagement data is that previous edits (i.e. corresponding to individual video clips) from the same source video have resulted in higher engagement when the edits (video clips) contain more coverage of the lead actor.

Finally, at step S1f, if aggregate context data is available, it is also retrieved. By way of example, aggregate context data may be that previous video clips delivered to viewers located in a particular State engage higher when they are a shorter duration (i.e. as determined from an evaluation of aggregated engagement metrics for that video, as will be described in more detail below).

At step S2, the algorithmic editing server 106 implements a clip generating algorithm for editing the source video to generate a plurality of candidate video clips, which selectively applies the metadata retrieved at step S1. Each candidate video clip comprises a subset of the source video, consisting of selected time sequences and/or pixel crops derived therefrom. The clip generating algorithm may re-order the time sequences and pixel crops.

In one implementation of the clip generating algorithm, only the video related metadata may be applied. Examples of how the clip generating algorithm may be configured to apply video metadata alone are outlined below:
  Include all time sequences from the source video that include the most prevalent face derived from facial recognition (step S2d of FIG. 2), &/or the most prevalent label derived from computer vision labelling (step S5a). Order the sequences in the same chronological order as they occur in the source video.
  Calculate relationship strength between all pairs of recognized faces in the source video, using a distance metric that considers the overlap of screen times that each face is present in the source video (as per step 5c of FIG. 3). Then determine the pair of faces that have the strongest relationship (based on frequency and overlap), and include all time sequences from the source video that include either or both face. Order the sequences in a repeating pattern of both faces/face #1/both faces/face #2.

Other implementations of the clip generating algorithm that additionally apply any available medium data, audience data, context data and engagement data:
  A multi-dimensional feature vector is constructed from the medium, audience and context data, and one or more machine learning algorithms are used to learn and predict the relationships between the feature vector and the video metadata.

By way of example, the engagement data may reflect that Red Bull's biking fans on Facebook watching on a mobile phone in California are two times more likely than average to engage with a clip labelled as "mud", 0.5 time more likely than average to engage with a clip labelled as "parachute".

Based on this knowledge, the clip generating algorithm may be configured to pick the time sequences from the source video that include the computer-vision labels (e.g. "mud") that are related to the highest engagement for the target medium, audience and expected contexts. Multiple candidate video clips that are derived from these time sequences may then be generated.

It will be understood that the clip generating algorithm can be programmed in various different ways to optimise audience engagement, depending on the desired implementation and available metadata.

At step S4 an authorised user (e.g. a content expert employed by the engagement system 102, or a marketer employed by a customer) may optionally review and selectively edit the candidate video clips (e.g. to filter or re-mix the selected time sequences, pixel crops). According to a particular embodiment, this is carried out by way of a web-based video editor.

At step S5, any differences between the algorithmic clips and the manually approved clips are analysed and used to improve the clip generating algorithm. By way of example, one specific customer of the engagement system 102 may want to ignore any source content that the computer vision labelling has identified (at step S2b of FIG. 2) as lens flare and the algorithm may be configured accordingly. Thus, it will be understood that the clip generating algorithm may be customised for individual clients of the engagement system 102 or applied more generally.

Once the final candidate video clips have been generated, they are communicated to the content distribution network 114 for subsequent delivery. The metadata associated with each candidate video clip is stored in the metadata store 112 with a reference to the corresponding video clip.

At step S6, responsive to determining a clip selection trigger, the algorithmic editing server 106 retrieves the metadata for the candidate video clips, as well as any available audience data, viewer data, engagement data and context data.

According to embodiments described herein, the clip selection trigger takes the form of a content request message placed by the viewer device 116. The content request message is received by the algorithmic editing server 106 and can take on different forms (and be triggered by different actions), depending on the digital medium. According to one embodiment, the content request is triggered by the viewer opening the email/web page/app. Alternatively, as discussed above, the content request may be generated as a result of a viewer selecting a URL included in the email/web page/app (i.e. that directs the application to a resource hosted by the engagement system 102).

At step S7, responsive to receiving the request message, the algorithmic editing server 106 implements a clip selection algorithm that applies the retrieved metadata for selecting a video clip. An instruction is then sent to the video content distribution network 114 for delivering the selected clip to the requesting viewer device.

In a particular embodiment, the clip selection algorithm evaluates context data associated with the content request message. This may include, for example, the device type (e.g. phone, laptop), application type, network type, screen density, location, local time, language preferences and the like.

The algorithmic editing server 106 may determine device type and application type from the HTTP User Agent header present in the content request. Location, network type, and time zone are identified by the server 106 by evaluating the source IP address of content request, and lookup databases.

Local time is calculated from the time of the content request and the derived time zone. Screen density may be detected using an HTML snippet that is triggered differently according to varying screen densities. Language preferences are determined from the HTTP Accept Language header present in the content request. In cases where HTTP request headers or IP address are obscured due to network proxies, the context data is marked as "Unknown" until it can be attributed from subsequent related requests (such as a click) that are not obscured.

Device type, application type, network type and screen density may be applied by the clip selection algorithm for selecting a video clip of a particular encoding format—for example, MP4, animated GIF, animated PNG, WEBP—that works best for engagement.

In a particular embodiment, engagement data may by representative of the number of previous video plays and one or more engagement metrics (e.g. dwell time, number of clicks on the video, basket events) for each candidate clip. Table 2 below provides an illustrative example.

TABLE 2

|  | Number of Plays | Engagement Metric - Number of Clicks |
|---|---|---|
| Clip #1 | 1560 | 124 |
| Clip #2 | 1800 | 90 |
| . . . Clip #n | 1625 | 95 |

The engagement metrics shown above should not be seen as limiting and it will be understood that any suitable behavioural or event driven metric and associated engagement point could be recorded and utilised, depending only on the desired implementation.

The selection of the best clip from the retrieved data is a classic problem of probability theory, referred to as the "multi-armed bandit" problem—ref. https://en.wikipedia.org/wiki/Multi-armed_bandit In a particular embodiment, the Thompson Sampling model is employed by the clip selection algorithm for selecting the best clip (see URL: https://en.wikipedia.org/wiki/Thompson_sampling).

These strategies remain valid even when the universe of candidate clips increases over time based on the candidate clip editor algorithm and/or the manual video editor creating additional candidate clips based on additional real-time aggregate engagement data.

When audience data, viewer data and context data is also available, the clip selection algorithm becomes what is known in probability theory as a "contextual multi-armed bandit problem". A multi-dimensional feature vector is constructed from one or more of the audience, viewer and context data, and a machine learning algorithm—e.g. a Neural Bandit algorithm or a Bandit Forest algorithm—is used to learn how the feature vector and engagement metrics relate to each other.

At step S8, the selected candidate video clip is delivered to the triggering viewer device(s) 116 by the content distribution network 114. According to embodiments described herein, a unique user identifier is generated for each viewer. As will be described in more detail below, the algorithmic editing server 106 records the output of the algorithm and the choice of video clip selected for that viewer so that subsequent engagement and context data can be attributed to that selection.

As discussed above, engagement data related to the particular viewer and the selected clip is captured from subsequent behaviour and events, specific to the particular medium (step S9). For example, in email, a "clickthru" event (used in aggregate to calculate click-to-open-rates for each video clip and which is a known online advertising performance metric representing an individual responding to an object by clicking on it) is captured from subsequent clicks on the video clip or surrounding content. The click is attributed to the chosen clip by embedding the unique user identifier into the clickthru link for each recipient of the email, to thereby allow the algorithmic engagement server 106 to associate the clickthru event to the specific recipient and the video clip that was previously selected for that recipient.

In addition, engagement data may include dwell duration, whether the viewer clicked on the video content, whether they executed a downstream event (e.g. placing a product in a cart or buying a product at checkout subsequent to viewing the presented video clip), or any other determinable downstream event representative of a user engagement with the video clip.

Finally, the engagement and context data is aggregated and stored by the algorithmic editing server 106. In an embodiment, as soon as the aggregated engagement data is stored it can be dynamically applied to any new content requests, or can be used for dynamically adjusting an engagement system 102 response to any current viewer interactions (e.g. to adjust a downstream event triggered though a viewer watching a candidate video clip).

Further Detail of System Configuration

According to the illustrated embodiment, one form of viewer device 116 comprises a smartphone. It will be understood that the smartphone is equipped with the necessary hardware and software to communicate with the video clip distribution network 114 for receiving the video clips for display to the viewer. The smartphone and network 114 communicate over a mobile broadband network. Although not illustrated in FIG. 1, the broadband network includes standard network elements including a base station controller, home location register, mobile switching centre, message centre, equipment identity register, and message gateway (although it will be appreciated that any suitable network connection may be utilised including private/public wireless networks, etc.).

As previously stated, the viewer device 116 should not be seen as being limited to any one type of device and can include any suitable computing device that is capable of receiving streaming video from the video clip distribution network 114.

Figure 4:
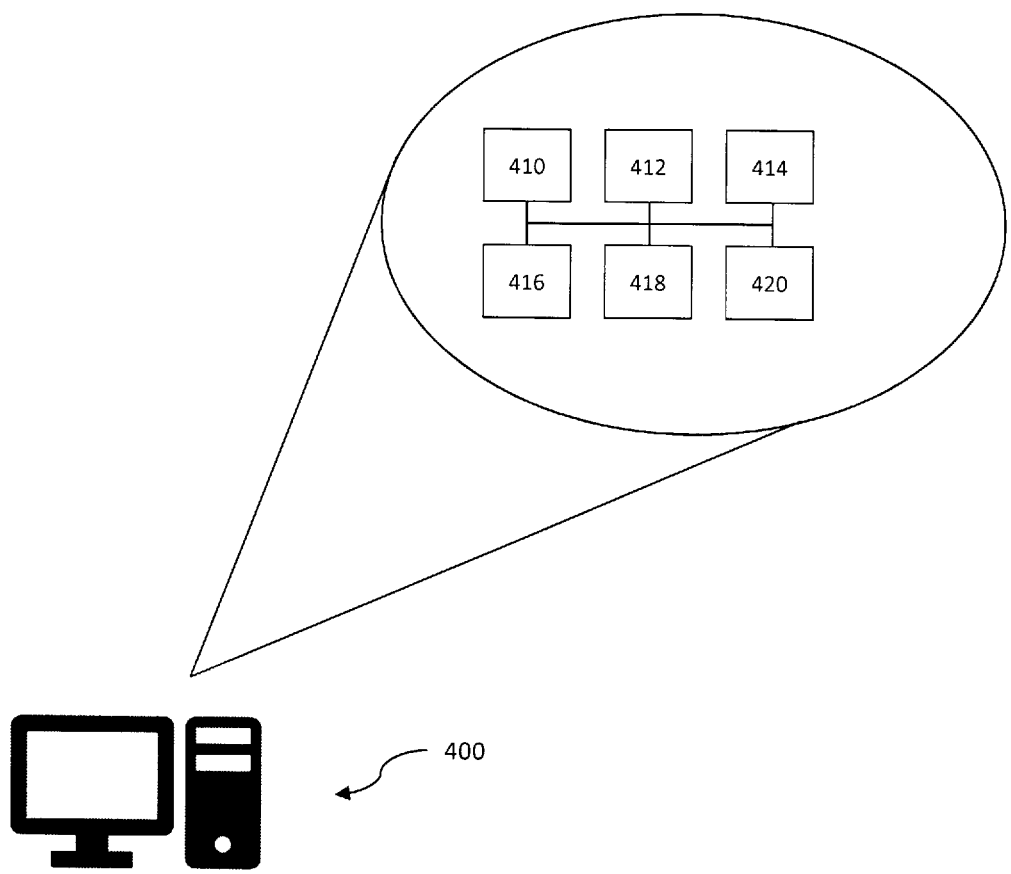
FIG. 4 is a schematic of a server computer, in accordance with an embodiment of the invention.

With additional reference to FIG. 4, there is shown a typical configuration for a server computer suitable for implementing any one of the video analysis, clip editing and video serving capabilities (i.e. as performed by server computers 104, 106 and 110). The server computer 400 includes a processor 410, memory 412, storage device 414, network device 416, and power supply 420. In one implementation, memory 412 is a volatile memory unit or units. In another implementation, memory 412 is a non-volatile memory unit or units. Memory 412 also can be another form of computer-readable medium (e.g., a magnetic or optical disk. Memory 412 may be non-transitory.

The storage device 414 can be any suitable form of device capable of providing mass storage. In one implementation, the storage device 414 can be or contain a computer-readable medium (e.g., a hard disk device, a flash memory or other similar solid-state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer or machine-readable medium.

The processor 410 can execute instructions within the server computer 400, including instructions stored in memory 412. The processor 410 can be implemented as a chipset of chips that include separate and multiple analogue and digital processors. The processor 410 can provide, for example, for implementation of the various video analysis, algorithmic editing, proximity distance, or clip selection algorithms as described in preceding paragraphs.

It will be understood that the various server systems 104, 106, 110, 114 need not be implemented as separate servers and certain or all functions performed by those servers could be integrated (e.g. such that, if desired, a single server could perform all functions).

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments described and envisioned herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A computer implemented method for algorithmically editing digital video content, the method comprising the steps of:
   receiving a video file containing source video from a video source;
   processing the video file to extract metadata representative of at least one of:
      video content within the source video; and
      audio content within the source video;
   applying labels to the extracted metadata and storing the labelled metadata in a metadata store in association with the video file;
   processing the labelled metadata to identify higher-level labels based at least in part on one or more semantic clustering algorithms and one or more statistical proximity algorithms programmed to statistically calculate proximity between labels based on the frequency and proportion of time that two or more labels are detected alone and simultaneously in the video file for the labelled metadata;
   storing any identified higher-level labels in the metadata store as additional metadata associated with the video file;
   implementing a clip generating algorithm that applies the stored metadata to selectively edit the source video to thereby generate a plurality of different candidate video clips therefrom;
   storing the plurality of candidate video clips in a video clip data store;
   storing metadata for the plurality of candidate video clips in the metadata store;
   determining that a viewer independent of the video source has triggered a clip presentation trigger via a viewer display device;
   responsive to determining the clip presentation trigger, implementing a clip selection algorithm that retrieves the metadata for the plurality of candidate clips as well as any available aggregated engagement data for the plurality of candidate video clips and applies the retrieved metadata and available aggregated engagement data to select one of the plurality of stored candidate video clips; and
   presenting the selected video clip to the viewer via their associated viewer display device; and
   wherein each time one of the stored candidate video dips is presented to a viewer one or more engagement metrics are recorded based on interactions by the viewer during or following that presentation and wherein the one or more engagement metrics recorded for presentations of the same candidate video clip to different viewers is recorded as aggregated engagement data for storing in association with the corresponding candidate video clip and wherein aggregated engagement data associated with the same or similar video file(s) is evaluated and selectively applied by the clip generating algorithm for creating additional candidate video clips for storing in the video clip data store; and
   wherein the candidate video clips are generated and stored ready for selection and presentation prior to the viewer display device triggering the clip presentation trigger.

2. The method in accordance with claim 1, further comprising processing the labelled metadata to infer applicable video genres and subgenres that are associated with individual labels or groupings of labels in the labelled metadata and wherein the inferred video genres are stored as additional metadata.

3. The method in accordance with claim 1, further comprising determining a digital medium by which the selected video clip is to be presented and wherein the digital medium is additionally applied by the clip generating algorithm for determining how to edit the source video for generating the plurality of candidate video clips.

4. The method in accordance with claim 1, further comprising determining individual viewer profile data for the viewer(s) and wherein the individual viewer profile data is additionally applied by the clip selection algorithm for selecting the candidate video clip to present to the one or more viewers.

5. The method in accordance with claim 1, wherein the one or more engagement metrics are selected from the following:
   (a) a dwell time recorded for viewers that have previously been presented the corresponding candidate video clip; and
   (b) a number of times a predefined event has been executed during or following a prior presentation of the corresponding candidate video clip.

6. The method in accordance with claim 1, wherein the metrics are recorded in association with a context for the prior presentation and wherein the method further comprises determining a current context for the presentation such that clip selection algorithm applies more weight to metrics associated with the current context than metrics that are not associated with the current context.

7. The method in accordance with claim 1, further comprising determining audience profile data for a collective group of viewers that are to be presented the selected video clip and wherein the audience profile data is applied by at least one of the clip generating and clip selection algorithms.

8. The method in accordance with claim 1, wherein the step of processing the video file to determine metadata representative of video content comprises analyzing pixels within each frame of the video to measure brightness levels, detect edges, quantify movement from the previous frame, and identify objects, faces, facial expressions, scene changes, text overlays, and/or events.

9. The method in accordance with claim 1, wherein the step of processing the video file to determine metadata representative of audio content comprises analyzing audio within the video file to determine predefined audio characteristics.

10. The method in accordance with claim 1, wherein the step of processing the video file to determine metadata representative of audio content comprises performing a speech recognition process to determine speech units within the source video.

11. The method in accordance with claim 1, further comprising extracting metadata embedded in the video file and storing the embedded metadata in the data store in association with the video file.

12. The method in accordance with claim 1, wherein the metrics are recorded and applied in real, or near real time, by the clip selection algorithm.

13. A computer system for algorithmically editing digital video content, the system comprising:
  a server system implementing:
    a video analysis module configured to:
      receive a video file containing source video from a video source;
      process the video file to extract metadata representative of at least one of:
        video content within the source video; and
        audio content within the source video;
      apply labels to the extracted metadata and storing the labelled metadata in a metadata store in association with the video file;
      process the labelled metadata to identify higher-level labels based at least in part on one or more semantic clustering algorithms and one or more statistical proximity algorithms programmed to statistically calculate proximity between labels based on the frequency and proportion of time that two or more labels are detected alone and simultaneously in the video file for the labelled metadata;
      store any identified higher-level labels in the metadata store as additional metadata associated with the video file; and
    a clip selection module configured to:
      implement a clip generating algorithm that applies the stored metadata to selectively edit the source video to thereby generate a plurality of different candidate video clips therefrom;
      store the plurality of candidate video clips in a video clip data store;
      store metadata for the plurality of candidate video clips in the metadata store;
      determine that a viewer independent of the video source has triggered a clip presentation trigger via a viewer display device;
      responsive to determining the clip presentation trigger, implementing a clip selection algorithm that retrieves the metadata for the plurality of candidate clips as well as any available aggregated engagement data for the plurality of candidate video clips and applies the retrieved metadata and available aggregated engagement data to select one of the plurality of stored candidate video clips; and
      present the selected video clip to the viewer via their associated viewer display device;
      wherein each time one of the stored candidate video dips is presented to a viewer one or more engagement metrics are recorded based on interactions by the viewer during or following that presentation and wherein the one or more engagement metrics recorded for presentations of the same candidate video clip to different viewers is recorded as aggregated engagement data for storing in association with the corresponding candidate video clip and wherein aggregated engagement data associated with the same or similar video file(s) is evaluated and selectively applied by the clip generating algorithm for creating additional candidate video clips for storing in the video clip data store.

14. A non-transitory computer readable medium storing at least one instruction, which when executed by a computing system, is operable to carry out the method in accordance with claim 1.

* * * * *